US005209097A

United States Patent [19]

Lallier

[11] Patent Number: 5,209,097

[45] Date of Patent: May 11, 1993

[54] FLUID OPERATED CORNERBEAD CRIMPING TOOL

[76] Inventor: Guy Lallier, 3837 Coco Plum Cir, Karanda Village 3, Pompano Beach, Fla. 33063

[21] Appl. No.: 513,987

[22] Filed: Apr. 24, 1990

Related U.S. Application Data

[63] Continuation-in-part of Ser. No. 448,737, Dec. 11, 1989, abandoned.

[51] Int. Cl.[5] .......... B23P 11/00

[52] U.S. Cl. .......... 72/325; 72/453.16; 29/243.5

[58] Field of Search .......... 72/325, 453.16, 453.15, 72/453.01, 407; 81/301; 29/243.5, 243.58, 243.57, 252, 432.1, 432.2

[56] References Cited

U.S. PATENT DOCUMENTS

| | | | |
|---|---|---|---|
| 2,944,262 | 7/1960 | Richman | 72/325 |
| 3,023,417 | 3/1962 | Michel | 227/108 |
| 3,160,890 | 12/1964 | Lefebvre | 72/407 |
| 3,255,525 | 6/1966 | Frenzel | 81/301 |
| 3,372,479 | 3/1968 | Fischer | 81/301 |
| 3,526,944 | 9/1970 | Cherup | 29/243.57 |
| 3,706,245 | 12/1972 | Van Shair | 81/301 |
| 4,288,016 | 9/1981 | Failla | 227/152 |
| 4,589,272 | 5/1986 | Hutson | 81/301 |
| 4,593,443 | 6/1986 | Wolford | 29/243.5 |
| 4,670,957 | 6/1987 | Wolford | 29/243.5 |
| 4,893,493 | 1/1990 | Jacques | 72/325 |
| 4,989,438 | 2/1991 | Simon | 72/325 |

*Primary Examiner*—Daniel C. Crane
*Attorney, Agent, or Firm*—Fishman, Dionne & Cantor

[57] ABSTRACT

A cornerbead crimping tool for crimping cornerbead to wallboard is presented which comprises a handle portion, an intermediate air cylinder portion and a crimping head portion which together form the crimping tool. The handle portion includes a trigger which, when actuated, delivers high pressure fluid (typically air) through a valve to a cylinder which includes a spring actuated piston therein. The piston is actuated by the high pressure air from the handle so that the piston rod is driven forward to an opening in the cylinder and into the crimping head portion. The crimping head includes a rigid housing having a V-shaped end for engagement to the cornerbead. A drive shaft is mounted in an opening within the housing and it is engaged by the piston rod. The drive shaft is pivotedly attached to articulated arms which terminate at crimping teeth. Thus, when the cylinder rod is forced outwardly of the cylinder, the drive shaft is actuated outwardly forcing the articulated arms inwardly wherein the crimping teeth crimp the cornerbead and secure the cornerbead onto a wallboard corner. The handle includes a flow opening so that subsequent to a driving stroke, the spring actuated piston can return to its normal position and the air present in the cylinder may exit through the flow opening in the handle. Preferably, the V-shaped head also includes a semi-cylindrical cut-out for crimping rounded cornerbead.

9 Claims, 5 Drawing Sheets

FLUID OPERATED CORNERBEAD CRIMPING TOOL

CROSS-REFERENCE TO RELATED APPLICATION

This is a continuation-in-part of U.S. application Ser. No. 448,737 filed Dec. 11, 1989, now abandoned.

BACKGROUND OF THE INVENTION

This invention relates generally to a device for installing metal corner strip used in conjunction with a wallboard assembly. More particularly, this invention relates to a device for installing metal cornerstrip or cornerbead on wallboard wherein the installation device is fluid activated, preferably by air.

Wallboard or sheetrock is well known and is used to provide smooth wall surfaces to the interiors of buildings. As is also well known, the corner or edge where two wallboards form a 90° angle require a metal cornerstrip to protect the wallboard corners from breakage. This metal cornerstrip comprises a flat metal sheet which is bent at an angle along the longitudinal center thereof. Typically, the flat metal sheet has spaced openings therethrough for receiving fasteners or the like. Metal cornerstrip of this type is well known by the term "cornerbead" and shall be referred to by that term hereinafter.

As mentioned, cornerbead is typically attached to the corner of a pair of wallboard sections using threaded fasteners or the like. It will be appreciated that the use of threaded fasteners to attach the cornerbead can be time consuming and therefore undesirable. Attempts to mechanically attach cornerbead by fastener means are known. For example, hammer actuated cornerbead crimping or clincher devices are known wherein a hammer actuates a cornerbead crimping device which then drives the cornerbead into the wallboard through a crimping action. Typically, these devices comprise a pair of articulated arms pivotably attached to a support which is received in a housing. The arms terminate at a pair of pointed teeth. When the housing is placed flush up against a cornerbead, a blow of the hammer against the support will drive the articulated arms against the cornerbead and pivot the teeth into the cornerbead thereby providing the required crimping action.

While suited for its intended purposes, the hammer actuated cornerbead crimper requires the installer to use both hands, one for holding the crimper and the other for driving the hammer. This process is both difficult and cumbersome and therefore a power actuated crimper is desired. A known power actuated crimper is disclosed in U.S. Pat. application Ser. No. 157,377 filed Feb. 18, 1988, now abandoned. However, this power actuated crimping device is electric and requires the use of a solenoid. This leads to several disadvantages and has been found to perform inadequately during usage.

SUMMARY OF THE INVENTION

The above discussed and other deficiencies and drawbacks of the prior art are overcome or alleviated by the cornerbead crimping tool of the present invention. In accordance with the present invention, the cornerbead crimping tool comprises a handle portion, an intermediate air cylinder portion and a crimping head portion which together form the crimping tool. The handle portion includes a trigger which, when actuated, delivers high pressure fluid (typically air) through a valve to a cylinder which includes a spring actuated piston therein. The piston is actuated by the high pressure air from the handle so that the piston rod is driven forward to an opening in the cylinder and into the crimping head portion. The crimping head includes a rigid housing having a V-shaped end for engagement to the cornerbead. A drive shaft is mounted in an opening within the housing and it is engaged by the piston rod. The drive shaft is pivotedly attached to articulated arms which terminate at crimping teeth. Thus, when the cylinder rod is forced outwardly of the cylinder, the drive shaft is actuated outwardly forcing the articulated arms inwardly wherein the crimping teeth crimp the cornerbead and secure the cornerbead onto a wallboard corner. The handle includes a flow opening so that subsequent to a driving stroke, the spring actuated piston can return to its normal position and the air present in the cylinder may exit through the flow opening in the handle.

Preferably, the V-shaped end of the crimping head also includes a semi-cylindrical cut-out portion for mating with rounded cornerbead. Such a head configuration would have the advantage of crimping cornerbeads having both 90 degree corners or rounded corners.

The cornerbead clincher in accordance with the present invention provides many features and advantages relative to either the hammer actuated cornerbead crimpers of the prior art or the electrical solenoid actuated cornerbead crimpers. These features and advantages include economy of manufacture in the small number of parts needed to make the power actuated cornerbead crimper. In addition, the high power achievable using high pressure fluid provides improved crimping characteristics relative to the hand actuated or electrical actuated prior art cornerbead crimpers.

The above discussed and other features and advantages of the present invention will be appreciated and understood by those of ordinary skill in the art from the following detailed description and drawings.

BRIEF DESCRIPTION OF THE DRAWINGS

Referring now to the drawinqs, wherein like elements are numbered alike in the several FIGURES.

DESCRIPTION OF THE PREFERRED EMBODIMENT

Figure 1:
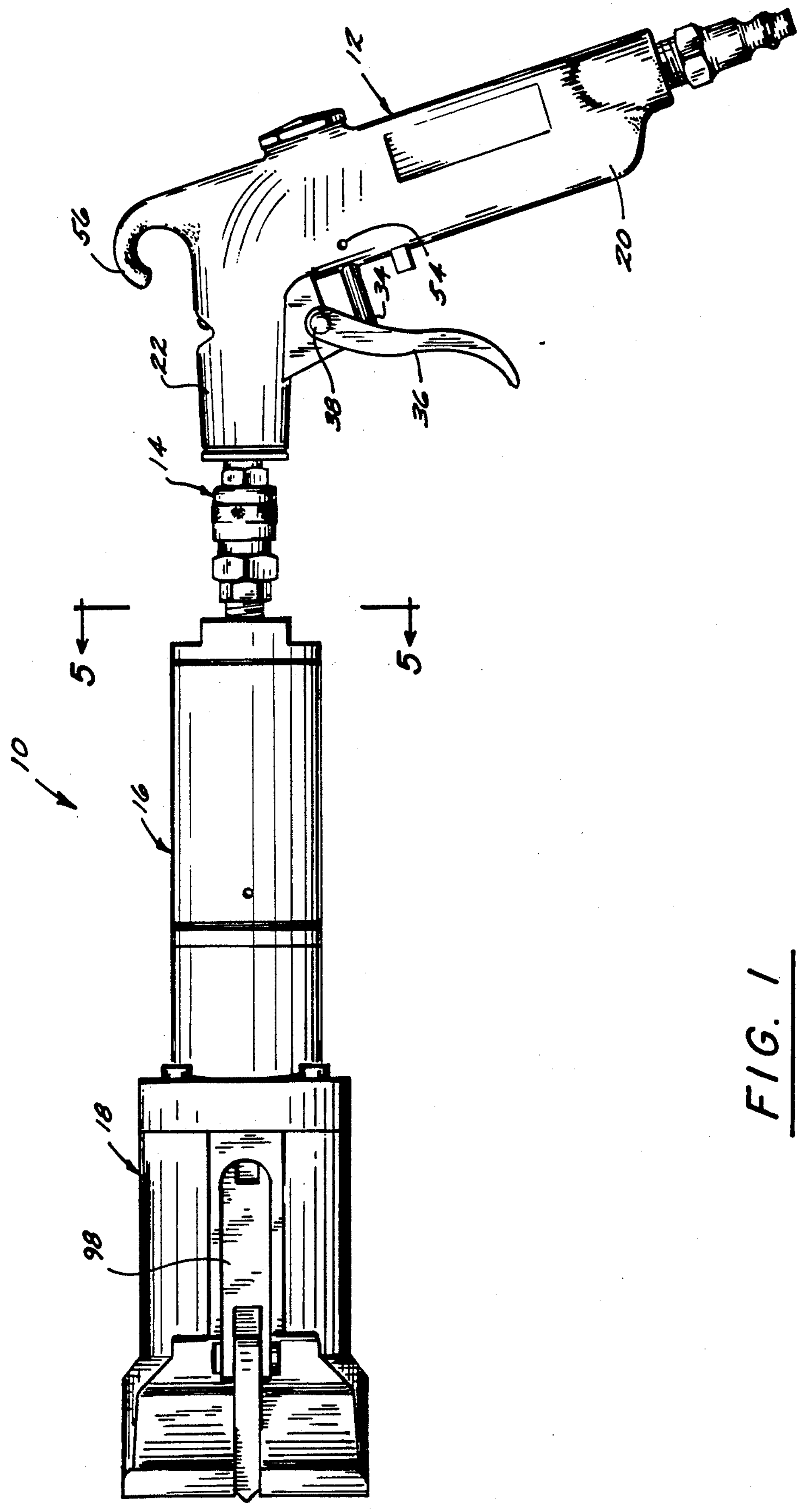
FIG. 1 is a side elevation view of the pneumatic crimping device in accordance with the present invention.
Figure 2:
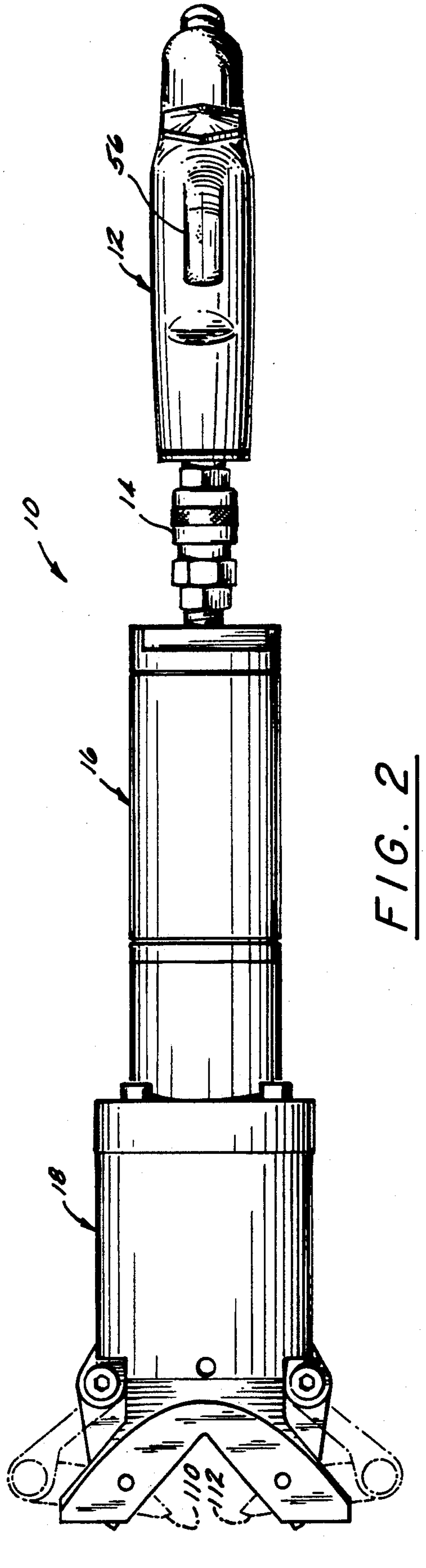
FIG. 2 is a top plan view of the device of FIG. 1.
Figure 3:
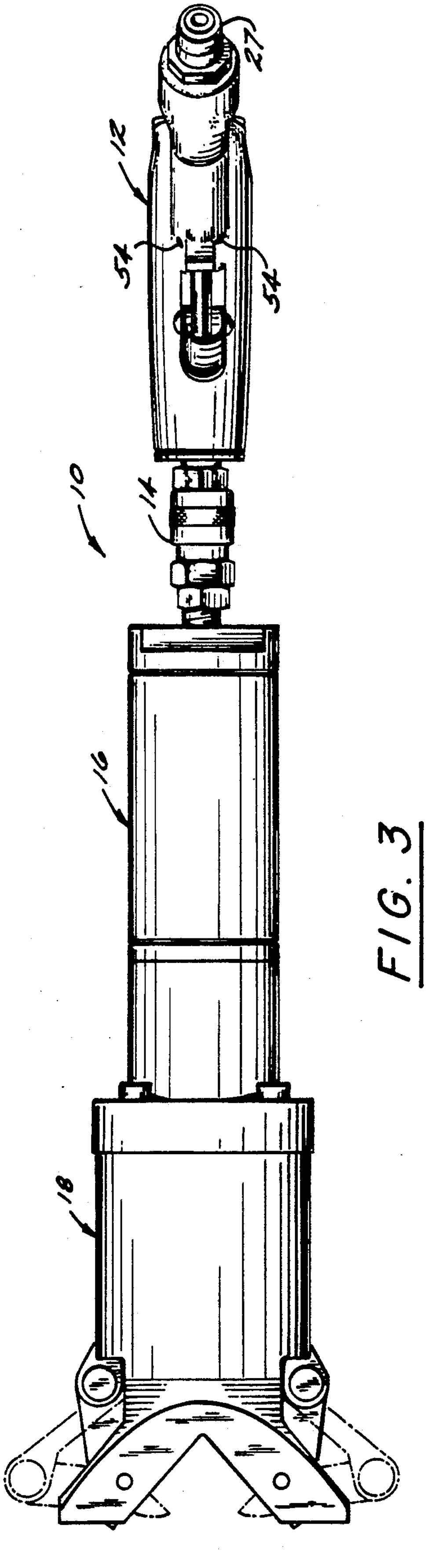
FIG. 3 is a bottom view of the device of FIG. 1.
Figure 6:
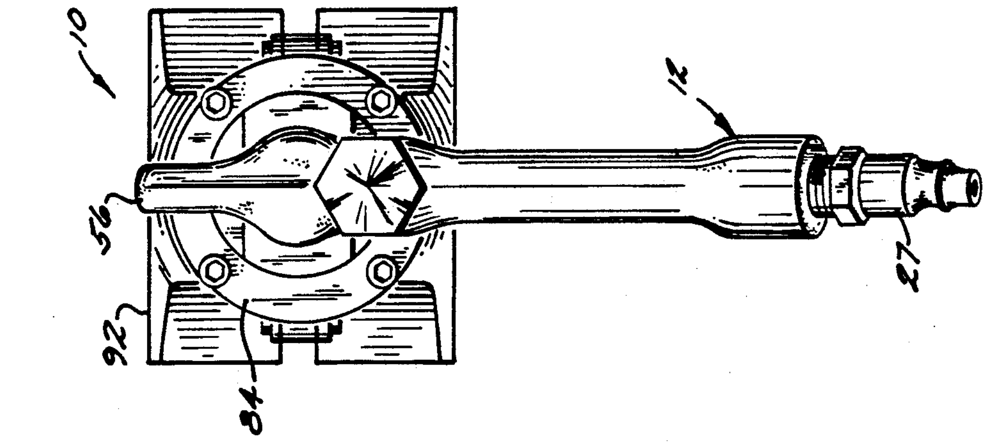
FIG. 6 is a rear elevation view of the device of FIG. 1.
Figure 5:
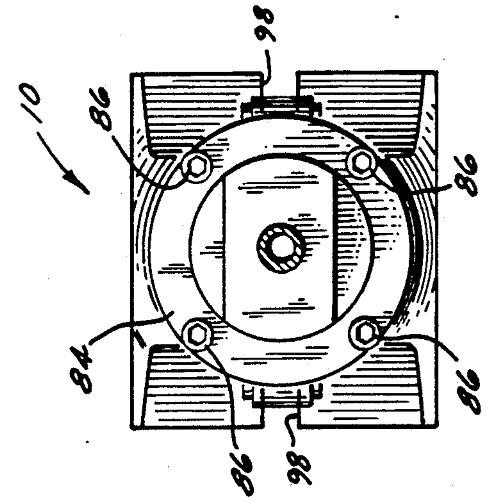
FIG. 5 is a cross sectional elevation view along the line 5—5 of FIG. 1.

Referring jointly to FIGS. 1–7, a fluid driven cornerbead crimping tool in accordance with the present invention is shown generally at 10. Crimping device 10 includes a handle portion 12 which is connected by a known pneumatic connector 14 to an air cylinder 16. In turn, cylinder 16 is threadably connected to a crimping head 18.

Figure 7:
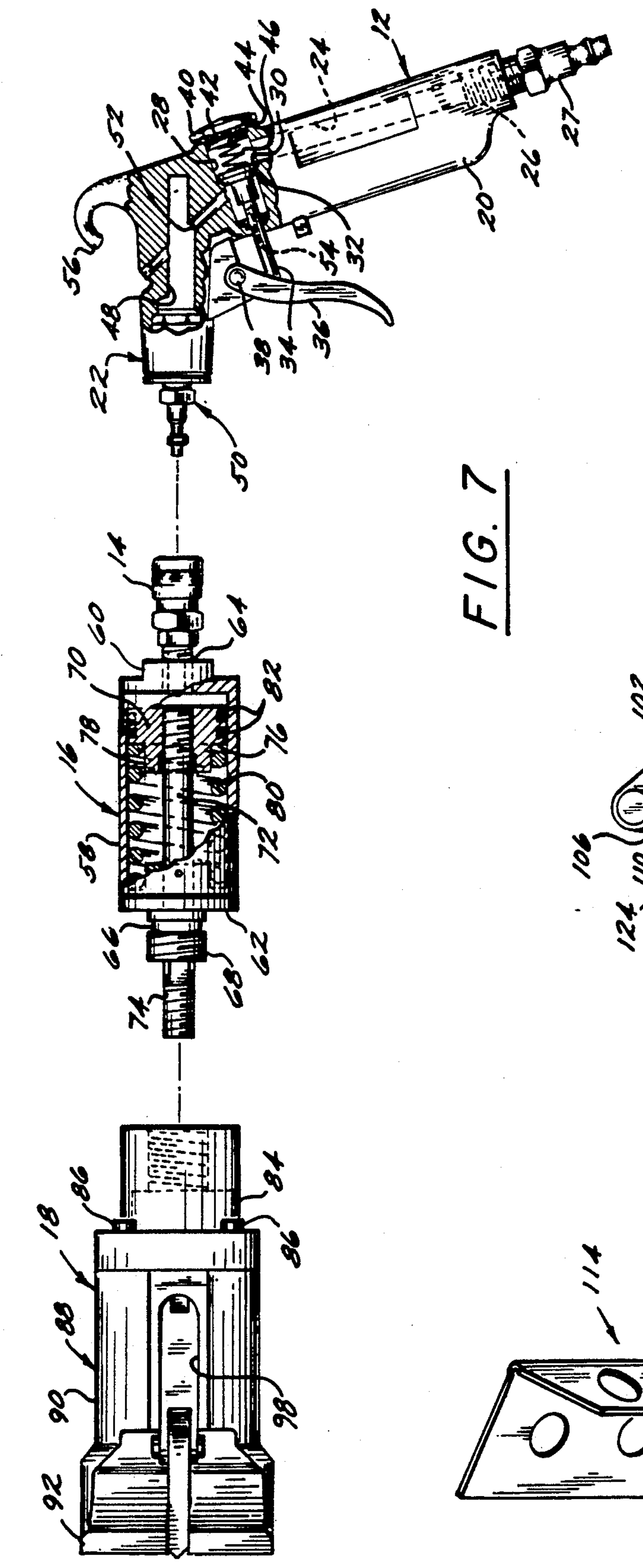
FIG. 7 is an exploded side elevation view of the device of FIG. 1.

Referring to FIG. 7, handle 12 has a grip or inlet end 20 and a nozzle or outlet end 22 angularly extending therefrom. Grip end 20 is formed with a passage 24 leading thereinto from a threaded inlet 26 having a fitting 27 threaded therein, allowing connection with the flexible hose of a conventional compressed air line (not shown). Passage 24 communicates at its inboard terminal with a circular valve well or cavity 28 in the handle, which well 28 is formed with an intermediate annular shoulder serving as a valve seat for a valve 30 having a resilient seat 32 and a valve stem 34 depending therefrom. Valve 30 is reciprocable relative to the handle body so that, in a closed position, as shown, the valve 30 rests on the valve seat 32 of the valve well 28 to close off communication between the upper and lower regions of the valve well and in an opened position, the valve is upwardly of the valve seat to allow communication between the upper and lower regions of the valve well.

A trigger 36 of conventional configuration is pivotedly mounted on the body 12 by means of a trigger pin 38 and the lower extremity of valve stem 34 extendable through a suitable opening in the handle body. As trigger 36 is operated inwardly, valve 30 is elevated upwardly of its seat to an "open" position thereabove.

The upper wall of valve well 20 is threaded and a hex nut 40 having a depending threaded portion 42 is threadedly engaged therewith in the valve well closing function. A gasket 44 circumscribes threaded portion 42 to ensure a tight closure. A valve spring 46 nestably seats in opposed spring seats in threaded portion 42 and valve 30 and urges the valve returnably onto its seat when the raised trigger is manually released. Nozzle end 22 has a passage 48 leading thereinto from an outlet 52. A nozzle, generally indicated by 50, is threadably received into passage 48.

An internal channel 52 extends between passage 48 and the lower portion of cavity 28. As best seen in FIG. 1, a pair of openings 54 extend between the lower portion of cavity 28 and the outside of handle 12. As a result, when valve 32 is in the closed position as shown in FIG. 7, any pressurized air within passage 48 will flow through channel 52 and out of handle 12 through flow openings 54.

Handle 12 also includes a hook 56 which may be used during storage. It will be appreciated that aside from the important flow openings 54, the remainder of handle 12 is known and commercially available. Handles of this general type are disclosed in U.S. Pat. Nos. 2,783,092 and 3,780,949.

Still referring to FIG. 7, a description will now be made of air cylinder 16. Cylinder 16 is a known device which is also commercially available. Cylinder 16 includes a cylindrical tube 58 and a pair of opposed flanged caps 60 and 62 on opposite ends of tube 58. Flange 60 includes a threaded opening 64 which threadably receives a known pneumatic fitting 14 therein. Flange 62 has an extended hub 66 which has both external threading identified at 68.

The interior of air cylinder 16 includes a piston comprising a piston head 70 threaded to a piston rod 72. Piston rod 72 extends through hub 66 outwardly of air cylinder 16 and includes threading 74 at the terminal end thereof. Piston head 70 includes a shoulder 76 and a section of lesser diameter 78 which receives a spring 80. Spring 80 is biased between piston head 70 and the interior surface of flange 62 so that piston head 70 is normally urged towards the right in FIG. 7 against flange 60. It will be appreciated that when pressurized fluid (air) is delivered through opening 64 of flange 60, piston head 76 is urged towards the left in FIG. 7 so that spring 80 is biased and piston rod 72 is urged outwardly of cylinder 58 towards the left in FIG. 7. A pair of seals 82 are positioned about the circumference of piston head 70 to prevent leakage of fluid around the piston head.

Figure 4:
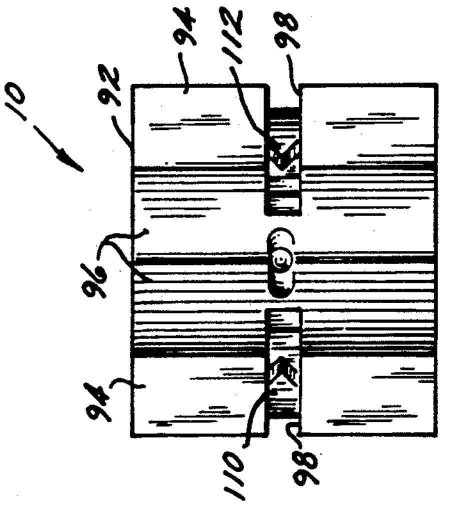
FIG. 4 is a front elevation view of the device of FIG. 1.

Still referring to FIGS. 1–7, cylinder head 18 includes a two piece body comprised of a flange 84 which is threaded (via four equally spaced screws 86) to a main body portion 88. Main body portion 88 has a cylindrical section 90 which terminates at a V-shaped head 92. Preferably, both portions 90 and 92 are machined or cast as one-piece. As best seen in FIG. 4, body portion 92 has a pair of outer flats 94 connected by a V 96. A pair of opposed grooves 98 extend towards each other from flats 94 inwardly towards V-section 96.

Figure 9:
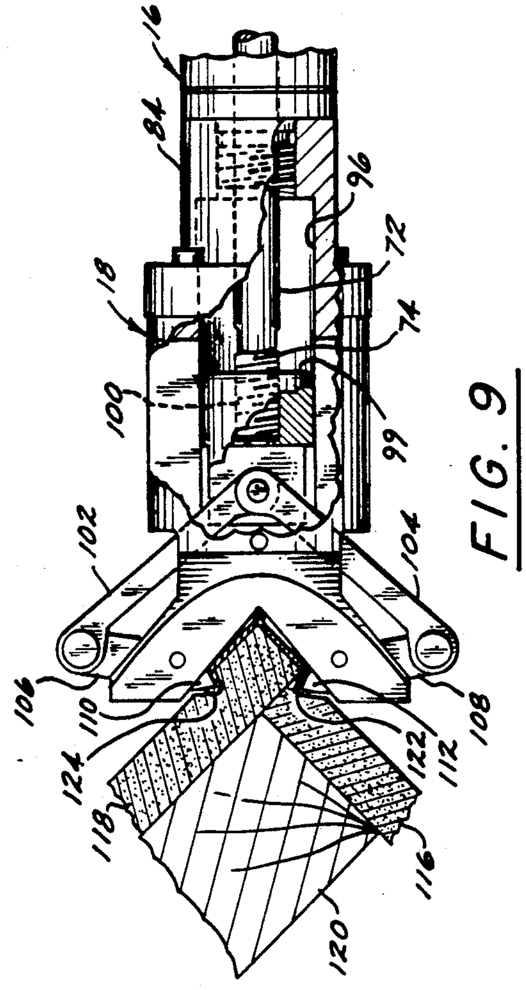
FIG. 9 is a top plan view, partly in cross section, depicting the device of FIG. 1 crimping the cornerbead of FIG. 8 to a wallboard corner.

Flanged housing portion 84 includes a central opening which is threaded and which is threadably engagable to the threading 68 on air cylinder 16. The interior of housing portion 88 includes a cylindrical bore 96 which is best shown in FIG. 9. Bore 96 communicates with the exterior of head 18 through a pair of opposed channels 98. Still referring to FIG. 9, a cylindrical lug 99 includes a smooth outer surface which is slidable in a forward and rearward direction within bore 96. Lug 98 includes a threaded opening 100 which threadably engages threading 74 on piston rod 70. Thus, as piston rod 70 reciprocates in and out of cylinder 16, lug 99 will move in a reciprocating manner within smooth bore 96. Lug 99 includes a forked termination which receives a pin for pivotable attachment to a pair of articulated arms 102 and 104. In turn, each of arms 102 and 104 are pivotably connected to a pair of crimping arms 106 and 108. Each of crimping arms 106 and 108 terminates at a sharpened tooth section 110 and 112.

The operation of the gripping device of the present invention will now be described. Of course, it will be appreciated that high pressure air is attached via fitting 27 to handle 12. When trigger 36 is actuated, valve 30 moves outwardly of valve seat 32 whereupon the high pressure air will pass into the lower portion of cavity 28 through channel 52 and passage 48. The high pressure air will then pass through fitting 13 where it will impinge or impact upon piston head 70. The high pressure air will then force piston head 70 towards the left of the figure whereupon piston shaft 72 will extend outwardly of cylinder 58. Simultaneously, lug 98 which is threadably attached to the end of piston shaft 72 will move longitudinally through housing 88 whereupon articulated arms 102 and 104 will swing outwardly causing arm 106 and 108 to pivot inwardly forcing teeth 110 and 112 into the position indicated by phantom lines in FIGS. 2 and 3 and shown by the solid lines in FIG. 9.

Figure 8:
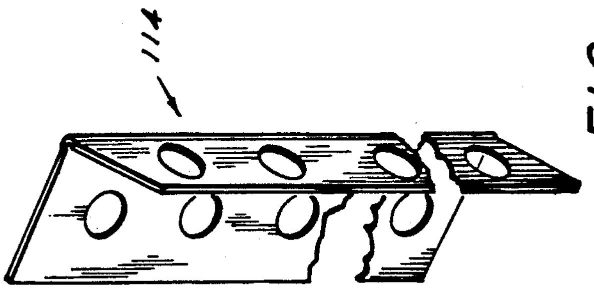
FIG. 8 is a perspective view of cornerbead used in conjunction with wallboard.

Turning now to FIG. 8, a section of well known cornerbead is shown generally at 114. Cornerbead 114 is a flat piece of metal having a bend longitudinally therethrough to define a corner section which is received over a wallboard corner such as depicted in FIG. 9. In FIG. 9, two sections of wallboard 116 and 118 are attached to a wall 120 to form a corner and a section of cornerbead 114 has been abutted against the wallboard corner. FIG. 9 also depicts the cornerbead crimping device of the present invention having been actuated by trigger 36 whereupon cornerbead 114 has been crimped at 122, 124 to wallboard 116 and 118.

An important feature of this invention is the presence of flow openings 54 in handle 12. It will be appreciated that subsequent to a crimping action as described above, spring 80 will urge piston head 70 to its normal positioning abutting flange 60. However, in order for this reciprocating action to take place, the fluid in cylinder 58 must have an exit; otherwise, spring 80 will not return piston head 70 to its original position. This required opening is provided by flow openings 54 and thereby allows the piston to regain its original position in preparation for a subsequent actuation by trigger 36.

Figure 11:
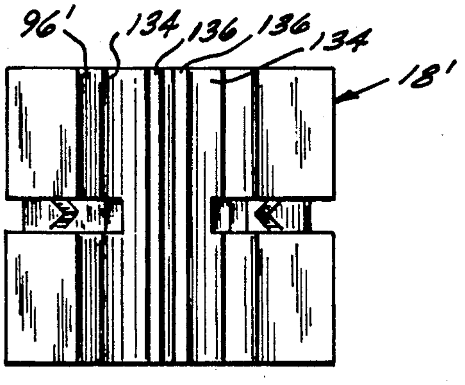
FIG. 11 is a front elevation view of a crimping device in accordance with a second embodiment of the present invention.
Figure 12:
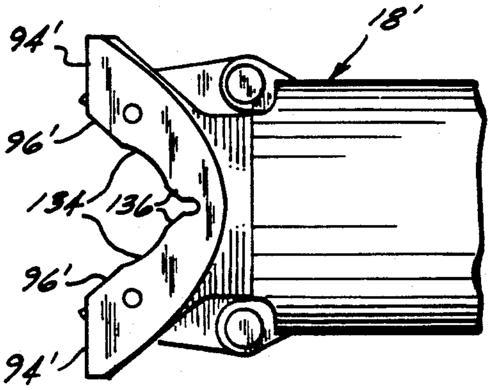
FIG. 12 is a side elevation view of the crimping device of FIG. 11.
Figure 10:
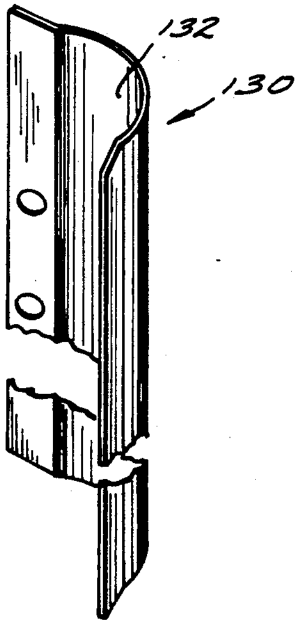
FIG. 10 is a perspective view of cornerbead having a rounded configuration.
Figure 13:
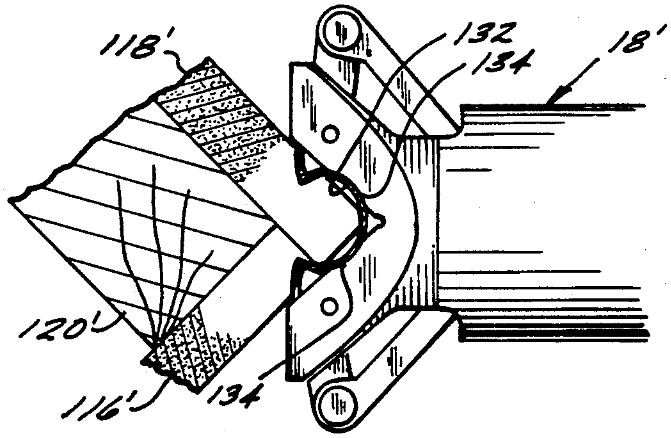
FIG. 13 is a side elevation view of the crimping device of FIG. 11 crimping the cornerbead of FIG. 10.

Turning now to FIG. 10, a section of cornerbead 130 having a rounded configuration 132 (as opposed to the 90 degree angled cornerbead 114 of FIG. 10) is shown. In FIGS. 11 and 12, an alternative embodiment of this invention for use with cornerbead 130 is shown at 18'. In this embodiment, V-section 96' includes a pair of opposed arcuate (or semi-cylindrical) cut-outs 134 formed along each arm of V-section 96'. As shown in FIG. 13, arcuate cut-outs 134 are sized and configured to receive and support rounded section 132 of cornerbead 130. In all other respects, the cornerbead crimping device of FIGS. 11 and 12 operates in the same manner as that described with regard to the first embodiment (see FIG. 9). An important feature of V-shaped head 96' is that it may be utilized with either cornerbead of the type shown in FIG. 10 or cornerbead of the type shown in FIG. 8. To permit this dual function, the arcuate cut-outs 134 are spaced downwardly from the root of the "V" so that two small intersecting planar portions 136 remain for receiving the angled base of cornerbead 114.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A fluid cornerbead crimping tool comprising:

handle means, said handle means including a hand gripping portion, a fluid inlet passage within said handle means, a fluid exit passage within said handle means, a valve between said fluid inlet and fluid exit passages, a trigger operatively connected to said valve wherein actuation of said valve into an open position provides fluid communication between said fluid inlet and fluid exit passages;

cylinder means in fluid communication with said fluid exit passage of said handle means, said cylinder means including a cylinder housing having a spring actuated piston means in said cylinder housing, said piston means including a piston head and a piston rod connected to said piston head, and piston rod extending outwardly of said cylinder housing through an opening, said cylinder housing being singularly, releasably connected at one end to said handle means by way of said fluid exit passage;

crimping head means connected to said cylinder means, said crimping head means being singularly, releasably connected to the other end of said cylinder means by way of said opening, said crimping head means terminating at a V-shaped surface for mounting onto cornerbead and said head means further including an internal elongated cavity having a lug therein, said lug being connected to said piston rod, a pair of articulated arms also being connected to said lug, each of said arms terminating at a crimping edge, wherein, upon the opening of said valve by said trigger, fluid flows through said fluid inlet and fluid exit passages and impinges against said piston head causing said piston head and said piston rod to move longitudinally compressing said spring and causing said lug to move longitudinally within said internal elongated cavity whereupon said articulated arms will drive said crimping edges toward each other and into the cornerbead; and each of said handle means, cylinder means and crimping head means being disconnectable from one another as separate, self contained units.

2. The tool of claim 1 wherein:

said piston rod is threadably fastened to said lug.

3. The tool of claim 1 wherein:

said cylinder means is threadably fastened to said crimping head means.

4. The tool of claim 1 including:

at least one fluid outlet means, wherein any fluid remaining in said cylinder housing of said cylinder means will be forced by said spring actuated piston means to flow outwardly therefrom through said fluid outlet means.

5. The tool of claim 4 wherein said fluid outlet means comprises:

at least one fluid outlet opening in said handle means to permit fluid outlet from said fluid exit passage when said valve is in a closed position.

6. A fluid cornerbead crimping tool comprising:

handle means, said handle means including a hand gripping portion, a fluid inlet passage within said handle means, a fluid exit passage within said handle means, a valve between said fluid inlet and fluid exit passages, a trigger operatively connected to said valve wherein actuation of said valve into an open position provides fluid communication between said fluid inlet and fluid exit passages;

cylinder means in fluid communication with said fluid exit passage of said handle means, said cylinder means including a cylinder housing having a spring actuated piston means in said cylinder housing, said piston means including a piston head and a piston rod connected to said piston head, and piston rod extending outwardly of said cylinder housing through an opening, said cylinder housing being singularly, releasably connected at one end to said handle means by way of said fluid exit passage;

crimping head means connected to said cylinder means, said crimping head means being singularly, releasably connected to the other end of said cylinder means by way of said opening, said crimping head means terminating at a V-shaped surface for mounting onto cornerbead and said head means further including an internal elongated cavity having a lug therein, said lug being connected to said piston rod, a pair of articulated arms also being connected to said lug, each of said arms terminating at a crimping edge, wherein, upon the opening of said valve by said trigger, fluid flows through said fluid inlet and fluid exit passages and impinges against said piston head causing said piston head and said piston rod to move longitudinally compressing said spring and causing said lug to move longitudinally within said internal elongated cavity whereupon said articulated arms will drive said crimping edges toward each other and into the cornerbead;

each of said handle means, cylinder means and crimping head means being disconnectable from one another as separate, self contained units; and wherein said V-shaped surface includes a pair of opposed arcuate portions for receiving rounded cornerbead.

7. The tool of claim 6 wherein said V-shaped surface has a base and wherein:

said arcuate portions are spaced from said V-shaped base so that a planar portion is sandwiched between said base and each of said arcuate portions.

8. The tool of claim 6 including:

at least one fluid outlet means, wherein any fluid remaining in said cylinder housing of said cylinder means will be forced by said spring actuated piston means to flow outwardly therefrom through said fluid outlet means.

9. The tool of claim 8 wherein said fluid outlet means comprises:

at least one fluid outlet opening in said handle means to permit fluid outlet from said fluid exit passage when said valve is in a closed position.

* * * * *